(12) United States Patent
Beerbohm

(10) Patent No.: US 7,244,884 B2
(45) Date of Patent: Jul. 17, 2007

(54) CLEANING DEVICE FOR CLEANING OF METAL STRINGS OF MUSICAL INSTRUMENTS

(76) Inventor: Giles John Christian Beerbohm, 5 Knowle Hill Cottages, Bodiam, East Sussex (GB) TN32 5UP ( * ) Notice: Subject to any disclaimer, the term of this patent is extended or adjusted under 35 U.S.C. 154(b) by 416 days.

(21) Appl. No.: 10/505,512

(22) PCT Filed: Feb. 25, 2003

(86) PCT No.: PCT/GB03/00788

§ 371 (c)(1),
(2), (4) Date: Nov. 22, 2004

(87) PCT Pub. No.: WO03/072274

PCT Pub. Date: Sep. 4, 2003

(65) Prior Publication Data

US 2005/0066794 A1    Mar. 31, 2005

(30) Foreign Application Priority Data

Feb. 28, 2002  (GB) ................................. 0204753.8

(51) Int. Cl.
*G10D 9/00* (2006.01)
(52) U.S. Cl. .................. 84/453; 442/340; 442/350; 15/104.52
(58) Field of Classification Search .............. 442/340, 442/351, 392, 394–399; 428/193, 903; 15/208, 210; 84/297 R, 453, 298–302
See application file for complete search history.

(56) References Cited

U.S. PATENT DOCUMENTS 4,112,808 A * 9/1978 Ketterer ...................... 84/453
4,197,780 A * 4/1980 Smith .......................... 84/458
4,528,889 A * 7/1985 Gentile, Jr. .................. 84/453
4,539,228 A * 9/1985 Lazarus .................... 84/297 S
5,223,329 A   6/1993 Amann ....................... 428/198
5,609,513 A   3/1997 Stark ........................... 451/59
6,458,442 B1 * 10/2002 McKay ..................... 428/40.1

(Continued)

FOREIGN PATENT DOCUMENTS

DE       30 03 402        8/1981

(Continued)

OTHER PUBLICATIONS

Patent Abstracts of Japan, vol. 1996, No. 01, Jan. 31, 1996 & JP 07 249156 A (Hiroko Yoshimoto; Others: 01), Sep. 26, 1995 Abstract.

(Continued)

*Primary Examiner*—Briggitte R. Hammond
(74) *Attorney, Agent, or Firm*—Nields & Lemack

(57) ABSTRACT

A cleaning device (2) for in-situ cleaning of metal strings (50) on a stringed musical instrument comprising a manually bendable, resilient laminate having a first planar portion and end portion extending out of the plane of the first portion, the laminate comprising a layer of plastics material (4) sandwiched between two layers (6,8) of a plastics micro-fibre fabric. The device (2) allows the metal strings (50) of, for example, a guitar (52) to be readily cleaned in-situ while on the instrument to maintain the brightness of tone of the string. A method of manufacturing the device is also disclosed.

18 Claims, 2 Drawing Sheets

U.S. PATENT DOCUMENTS

| | | | | |
|---|---|---|---|---|
| 6,503,855 B1* | 1/2003 | Menzies et al. | ............ | 442/328 |
| 6,998,360 B1* | 2/2006 | Picard | ....................... | 442/381 |
| 7,179,317 B2* | 2/2007 | Chung et al. | ............... | 428/357 |
| 2005/0084647 A1* | 4/2005 | Menzies et al. | ............ | 442/382 |
| 2006/0185108 A1* | 8/2006 | Hoadley et al. | ........... | 15/209.1 |
| 2006/0272115 A1* | 12/2006 | Kacher et al. | ................ | 15/208 |

FOREIGN PATENT DOCUMENTS

GB  2 222 298  2/1990

OTHER PUBLICATIONS

Patent Abstracts of Japan, vol. 1995, No. 07, Aug. 31, 1995 & JP 07 110925 A (Osaka Gas Co. Ltd), Apr. 25, 1995 Abstract.

Patent Abstracts of Japan, vol. 2000, No. 02, Feb. 29, 2000 & JP 11 309108 A (Iwamoto Norihiko), Nov. 9, 1999 Abstract.

The International Search Report dated May 23, 2003.

* cited by examiner

CLEANING DEVICE FOR CLEANING OF METAL STRINGS OF MUSICAL INSTRUMENTS

This invention relates to a cleaning device and more particularly to a device for cleaning the metal strings of a stringed musical instrument.

Many types of instruments are strung with metal strings of steel or phosphor bronze including 6 and 12 stringed guitars (electric and acoustic) and banjos. Such strings are known to be prone to a rapid build up of dirt and sweat both on the top of the strings where the fingers actually touch them but, more especially, underneath the strings. The dirt derives not only from particles carried to the strings by the player's fingers but also from particles that are worn off from the fret board during playing.

The primary effects of this string contamination are to cause the string to rapidly lose its tone becoming less bright and "flat" sounding over a timescale of a few hours, typically, and to corrode eventually leading to the need for string replacement. A corroded metal string is also more abrasive than a new string so increasing the rate of wear of the frets by the strings.

It is usual for a player to wipe over the top of the strings from time to time with a handkerchief or the like which can remove some sweat and dirt but this leaves the underneath of the string uncleaned which, as a practical matter, is inaccessible to a cloth cleaner due to the small distances between the frets and the strings. This is particularly the case towards the neck of the instrument where attempts to wipe the underside of the strings will generally stretch the string, putting it out of tune. Also such cleaning methods do not address the corrosion issue.

The present invention, in a first aspect, provides a cleaning device for in-situ cleaning of metal strings on a stringed musical instrument comprising a manually bendable, resilient laminate having a first planar portion and an end portion extending out of the plane of the first portion, the laminate comprising a layer of plastics material sandwiched between two layers of plastics micro-fibre fabric.

The plastics micro-fibre fabric can absorb moisture as well as being sufficiently hard-wearing to wipe dirt and corrosion from the strings. The shape of the device allows insertion of the end portion underneath a string while holding the guitar, for example, in the playing position. Being bendable it can adapt to the contours of the strings across the neck as it is moved up and down between the strings and the frets. This also allows the device to be pressed to touch all the tops of all the strings simultaneously for rapid cleaning of the top surfaces. Being resilient the device adopts its original shape on completion of cleaning.

The fabric may be a mixture of polyester and nylon, for example a mixture of 76% by weight polyester and 24% by weight nylon.

The end portion may be curved outwardly from the first planar portion, or it may be planar, and meet the planar first portion at a straight edge. In this case the first planar portion and end planar portion may meet at an angle of between about 135° and 160° although 150° has been found to be most convenient to use, the end portion extending outwardly from the first portion about 10 mm and extending to about 5 mm out of plane from the first planar portion. Preferably the corners of the device are rounded.

The fabric preferably covers all of each side of the plastics layer.

The two layers of fabric may be part of a continuous piece of fabric which also covers the end of the plastics layer along the extended edge of the end portion.

The laminate should ideally be no more than about 1 mm thick. The thickness is not critical but the thinner the better for ease of use and the more resilient the plastics material the thinner the device can be while allowing ready manual bending and shape restoration after bending.

The present invention, in a second aspect, provides a method of making the device of the present invention and comprises forming a laminate by securing a layer of micro-fibre material to each side of a planar, manually bendable, resilient plastics substrate to form a laminate and then deforming an end portion of said laminate out of plane from the remainder of the laminate.

The fabric layers may be secured to the substrate by adhesive or any other suitable method.

A single piece of fabric may be looped around an end of the substrate prior to securing to the substrate to form the laminate. The edges of the laminate having an edge of the substrate exposed after forming the laminate may be heat-sealed or the edges of the fabric stitched to the plastics layer to help resist the fabric fraying.

The end portion may be deformed out of the plane of the remainder of the laminate by heating the end portion, bending the edge to a desired shape and orientation and allowing the laminate to cool with the end portion in the desired shape and position.

An embodiment of the cleaning device and one method of its manufacture will now be described, by way of examples only, with reference to the accompanying drawings, of which:

Figure 1:
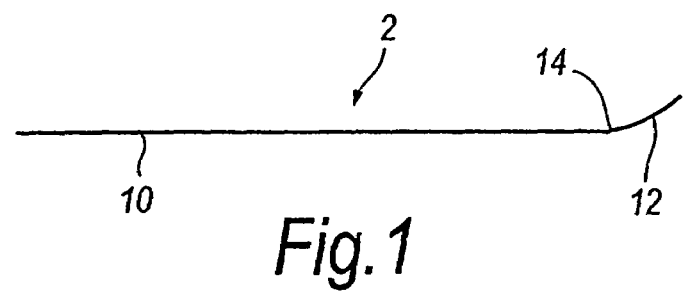
FIG. 1 is a diagrammatic end view of an embodiment of the present invention.
Figure 2:
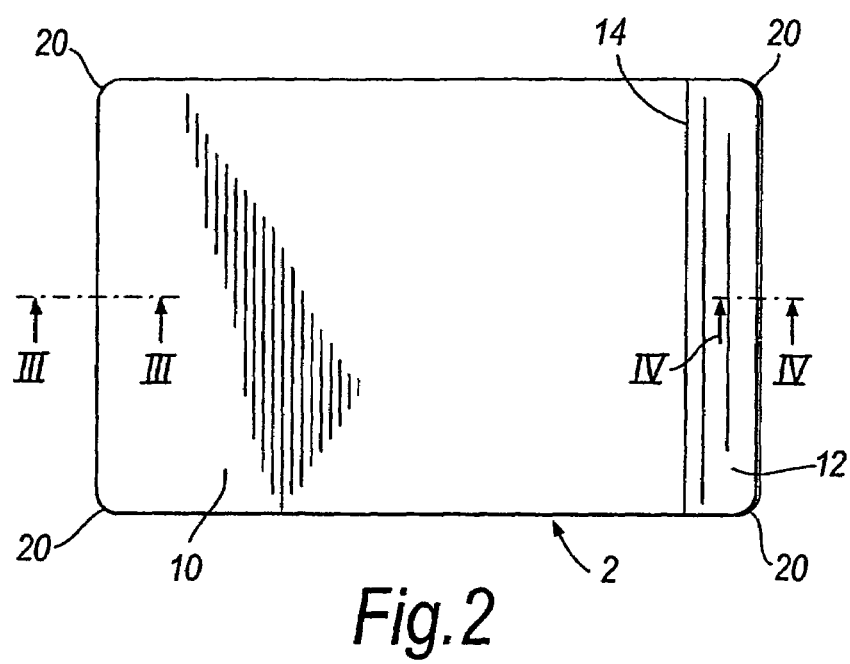
FIG. 2 is a diagrammatic plan of the embodiment of FIG. 1.

Referring to FIGS. 1 to 4, a cleaning device 2 according to the present invention has been formed from a laminate having a thin plastics layer 4 sandwiched between a first layer of micro-fibre fabric 6 and a second layer of micro-fibre fabric 8. The laminate has a first planar portion 10 and an upturned end portion 12 which meet at a fold line 14. The end portion is planar in this embodiment but could be curved as viewed from the side of FIG. 1, for example.

Figure 3:
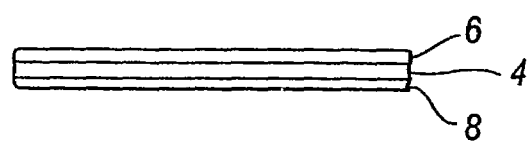
FIG. 3 is a diagrammatic part sectional view of the embodiment of FIGS. 1 and 2 viewed in the direction III—III of FIG. 2.
Figure 4:
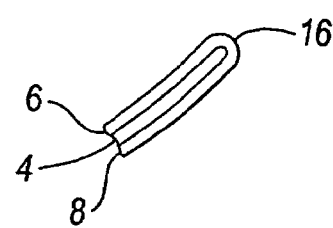
FIG. 4 is a diagrammatic part sectional view of the embodiment of FIGS. 1 and 2 viewed in the direction IV—IV of FIG. 2.

In this particular embodiment the plastics layer 4 is about 0.7 mm thick and of a resilient, manually bendable plastics material so as to allow the laminate to bend under manual pressure and restore to its original shape when the pressure is released. The fabric layers 6 and 8 are of a plastics microfibre fabric of 76% polyester and 24% nylon (by weight). The fabric layers are part of a single piece of fabric which is turned over the edge 14 of the end portion 12 to form fabric fold 16 (as best seen in FIG. 3). The total thickness of the device is less than about 1.0 mm.

The cleaning device 2 is, in this case, generally-rectangular in plan view with corners 20 rounded off. The sides of the laminate other than the fold 16 are melted to seal the edges of the fabric against fraying but could be stitched either alone or additionally to the heat sealing.

The illustrated cleaning device measures 57 mm wide (parallel to fold 14) with the first portion 10 being 77 mm long and the end portion 10 mm deep rising to be 5 mm out of the plane of the first portion 10, as shown in FIG. 1.

The dimensions are not critical but should be selected so the end portion 12 will not span two strings of the instrument to be cleaned by the device and the length of the laminate of the first portion should be long enough to span all the strings of the instrument. The illustrated device meets these requirements for a standard 6 string guitar whilst being of convenient size to carry in a pocket or wallet so being ideal for stage use or travelling musicians.

The illustrated device 2 was manufactured by taking a credit card sized rectangular plastics substrate, applying an adhesive to the plastics substrate, and once tacky, a layer of plastics micro-fibre fabric was applied to the substrate to cover both sides of the substrate the layers being pressed together to form the laminate. The laminate corners were then rounded off and all exposed edges of fabric/substrate laminate heated to melt and seal these edges. The end of the laminate by the folded end 16 of the fabric was then heated and bent out of plane to form the angled end portion and allowed to cool in this position.

The device 2 may be used, as will now be described with reference to FIGS. 5 to 8, to clean the metal strings 50 of a guitar 52 and the frets 54 of a fret board 56.

Figure 5:
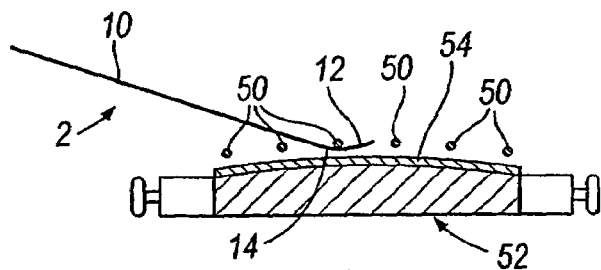
FIGS. 5 to 8 are diagrammatic views illustrating methods of using the embodiment of FIGS. 1 and 2.

Referring to FIG. 5, the cleaning device 2 is inserted between a pair of strings so the fold 14 of the device lies under a string. The device 2 can then be moved up and down the length of the guitar neck to absorb sweat, clean off dirt and abrade corrosion to polish the string, that may be present on the underside of the string being cleaned. The device will also, simultaneously, clean the fret wires underneath the string. This cleaning operation can be carried out by the player while the guitar is in the playing position.

Figure 6:
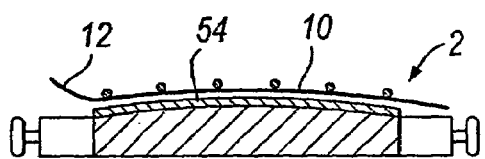
Figure 7:
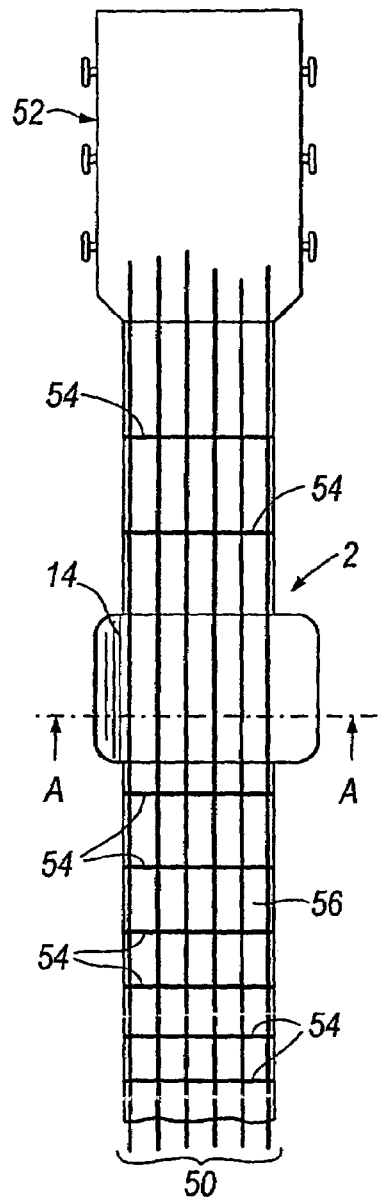

FIGS. 6 and 7 illustrate a further cleaning mode in which the first portion 10 of the device 2 is inserted beneath all the strings 50 which can then be cleaned along with the frets 5 by moving the device 2 up and down the neck of the guitar 52.

Figure 8:
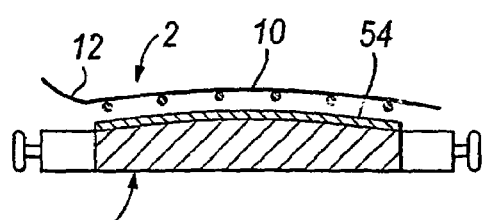

FIG. 8 illustrates a further cleaning mode in which the first portion 12 is laid across the top of the strings 50 and the tops of the strings 50 are cleaned by moving the device up and down the neck of the guitar while exerting the downward pressure.

The bendable, ie. flexible, nature of the device allows it to be extracted even if beneath the strings at the top of the neck of the guitar without straining and detuning the strings.

The invention claimed is:

1. A cleaning device for in-situ cleaning of metal strings on a stringed musical instrument comprising a manually bendable, resilient laminate having a first planar portion and an end portion extending out of the plane of the first portion, the laminate comprising a layer of plastics material sandwiched between two layers of plastics micro-fibre fabric.

2. A device as claimed in claim 1, in which the fabric is a mixture of polyester and nylon.

3. A device as claimed in claim 2, in which the mixture is 76% by weight polyester and 24% by weight nylon.

4. A device as claimed in claim 1, in which the end portion is curved outwardly from the first planar portion and which meets the planar first portion at a straight edge.

5. A device as claimed in claim 1, in which the end portion is planar and which meets the planar first portion at a straight edge.

6. A device as claimed in claim 1, in which the corners are rounded.

7. A device as claimed in claim 1, in which the fabric covers all of each side of the plastics layer.

8. A device as claimed in claim 1, in which the two layers of fabric are part of a continuous piece of fabric which also covers the end of the plastics layer along the extended edge of the end portion.

9. A device as claimed in claim 4, in which the first planar portion and the end planar portion meet at an angle of between 135° and 160°, preferably 150°.

10. A device as claimed in claim 9, in which the end portion extends outwardly from the first portion about 10 mm.

11. A device as claimed in claim 10, in which the end portion extends to about 5 mm out of the plane of the first planar portion.

12. A device as claimed in claim 1, in which the laminate is no more than 1.0 mm thick.

13. A method of making a cleaning device, comprising forming a laminate by securing a layer of micro-fibre material to each side of a planar, manually bendable, resilient plastics substrate to form a laminate and then deforming an end portion of said laminate out of plane from the remainder of the laminate.

14. A method as claimed in claim 13, in which the fabric layers are secured to the substrate by adhesive.

15. A method as claimed in claim 13, in which a single piece of fabric is looped around an end of the substrate prior to securing the fabric to the substrate to form the laminate.

16. A method as claimed in claim 13, in which the edges of the laminate having an edge of the substrate exposed after forming the laminate are either heat-sealed and/or are stitched.

17. A method as claimed in claim 13, in which the corners of the laminate are rounded off.

18. A method as claimed in claim 13, in which the end portion is deformed out of the plane of the remainder of the laminate by heating the end portion, bending the edge to a desired shape and orientation and allowing the laminate to cool with the end portion in the desired shape and position.

* * * * *